United States Patent [19]

Morgan et al.

[11] Patent Number: 5,356,116
[45] Date of Patent: Oct. 18, 1994

[54] SHAFT AND VALVE DISC CONNECTION FOR BUTTERFLY VALVE

[75] Inventors: David R. Morgan; Wayne C. McClelland, both of Madison, Kans.

[73] Assignee: ABZ Manufacturing, Inc., Madison, Kans.

[21] Appl. No.: 139,003

[22] Filed: Oct. 21, 1993

[51] Int. Cl.$^5$ .............................................. F16K 1/22
[52] U.S. Cl. ...................................... 251/308; 251/305
[58] Field of Search ........................ 251/318, 305, 308

[56] References Cited

U.S. PATENT DOCUMENTS

| | | |
|---|---|---|
| 3,155,368 | 11/1964 | Shafer . |
| 3,539,148 | 11/1970 | Boos . |
| 3,701,362 | 10/1972 | Reese . |
| 4,225,114 | 9/1980 | Barthelemy . |
| 4,303,094 | 12/1981 | Rothwell et al. . |
| 4,496,135 | 1/1985 | Scobie . |
| 4,697,615 | 10/1987 | Tsuchimoto et al. . |
| 4,699,357 | 10/1987 | Sisk . |
| 4,944,325 | 7/1990 | Baldwin et al. . |
| 5,125,624 | 6/1992 | Yohner . |

FOREIGN PATENT DOCUMENTS 1934203  6/1971  Fed. Rep. of Germany .

*Primary Examiner*—John C. Fox
*Attorney, Agent, or Firm*—Daub Legal Services

[57] ABSTRACT

An improved stub shaft to disc connection for a butterfly valve is provided having a valve disc with a hub. The valve disc is adapted to be rotated between an open and closed position. A valve disc seat is adapted to engage the valve disc in the closed position. A shaft is joined to the valve disc to permit torque to be transmitted to the valve disc from a point remote therefrom. The shaft is joined to the valve disc by forming the valve disc with a portion of increased thickness (hub) relative to the main portion of the disc. The portion of increased thickness is formed at a point adjacent the circumference of the disc. A hole (bore) is then machined into the portion of increased thickness parallel to the disc. The bore consists of a single larger aperture contiguous with a plurality of smaller apertures, the plurality of smaller apertures, positioned at a point more distal the circumference of the disc than the single larger aperture. The single larger aperture has a diameter slightly larger than the diameter of the shaft. The end of the shaft being inserted into the hub bore has mounted into it a plurality of dowels. The diameter, number and spatial placement of these dowels is identical to that of the plurality of smaller apertures present in the hub bore. The diameter of the dowels is slightly less than the diameter of the smaller apertures. The shaft is inserted into the single larger aperture of the hub bore of the valve disc and pressed in. The dowels, are of such a length and diameter that they insert and seat firmly into the smaller apertures of the valve disc hub preventing relative movement between the disc and shaft. This engagement of the shaft and the dowels in the single larger and plurality of smaller apertures of the hub bore respectively, forms a secure, although not permanent, connection between the shaft and the disc.

15 Claims, 4 Drawing Sheets

SHAFT AND VALVE DISC CONNECTION FOR BUTTERFLY VALVE

BACKGROUND OF THE INVENTION

I. Field of the Invention

The present invention relates generally to butterfly valves and more particularly to a butterfly valve having an improved stub shaft to disc connection between the valve shaft and the valve disc. The improvement allows for easy removal and replacement of the valve shaft without invasion of the valve housing or flow line.

II. Description of the Related Art

Butterfly valves have historically been provided with one of two general types of connections between the actuator shaft and the valve disc. In one type of connection the disc includes a portion of increased thickness running longitudinally down the center of the disc and the actuator shaft is passed completely through the center of the disc and pivoted for rotation at the top and bottom of the valve. While such connections have been generally successful, they suffer from the disadvantage of being relatively expensive due to increased material and machining costs and also suffer from the disadvantage that a somewhat increased restriction to flow is presented when the valve is in the open position. A second general type of actuator shaft connection has been generally called a stub shaft connection. In stub shaft butterfly valves the disc includes portions of increased thickness (hubs) at the top and the bottom of the disc only. The actuator shaft is partially inserted into the hub at the top of the disc and a small shaft is inserted into the bottom hub of the disc. Such stub shafts have been connected to the disc in a variety of manners. In some instances the shafts have been pinned or bolted to the disc. Another approach has been to use a broached type connection such as a square connection or a hexagonal connection. Such connections have been subject to the disadvantages of leaking, providing protuberances into the flow stream, or looseness of connection resulting in a backlash, making it difficult to close the valve tightly, providing poor control with automatic actuators, or even permitting shaft blow out. Another type of connection which is known and which tends to overcome some of the aforementioned difficulties is a knurled or upset interference fit between the shaft and the valve disc. In this type of connection the shaft is provided with projections on one end thereof, which when forced into contact with the hole in the top of the disc, tends to radially deform the hole thereby resulting in an interference fit. This type of connection has suffered from the disadvantage that where a good connection has been made, high stress is created in the valve disc, which is usually nodular iron or stainless steel, thereby increasing the possibility of failure of the valve disc. These high stress levels are required because the disc hub stresses must create a high compressive frictional force in order to fully transmit the valve shaft torque in addition to preventing backlash and preventing the shaft from blowing out due to normal or abnormal internal pressures. While the disc hub may be made larger to reduce the stresses, this increases the cost of material. Furthermore, in those instances where the interference fit is not tight enough, valves may fail under pressure by forcing the shaft axially out of the hole, or by the interference connection being inadequate to transmit the required torque from the shaft to the disc.

Additionally, in the types of connections mentioned above, there is the potential problem, when using automated shaft drive systems, that the valve disk may become stuck or frozen in a given position in the flow line and create a situation where the shaft driving mechanism, such as an electric motor, is working against constant resistance over a period of time to free the stuck valve disc. This may lead to over heating of the motor which may result in burn out and destruction of the motor, thereby destroying expensive equipment and creating a fire hazard especially around flammable flow line materials. The costs in both replacement and repair materials as well as the concomitant down time associated with such a scenario are obvious.

Boos, in U.S. Pat. No. 3,539,148, discloses upper and lower split mounting pins for center pivoting the valve disc within the valve body, in combination with a solenoid actuator shaft. However, the pins are not easily removable.

In U.S. Pat. No. 3,701,362, to Reese, a butterfly valve housing assembly is disclosed, for indicating exteriorly, the open or closed position of the butterfly valve, by interconnection between the vane, drive shaft and outside indicator.

Barthelemy et. al. in U.S. Pat. No. 4,225,114, discloses a spline assembly on one end of the shaft for securing an actuator shaft to the hub of a valve disc of a butterfly valve. The assembly is a permanent connection formed by a pressure fit, wherein the splines cut grooves in the hub. The shaft, once inserted in the hub bore cannot be removed.

Another U.S. Pat. No. 4,303,094, to Rothwell, discloses a plastic coating of corrosive resistant composition bonded to the bearing means contained within the shaft bore of a butterfly valve assembly, thereby enhancing the longevity of bearing life.

Tsuchimoto et. al. in U.S. Pat. No. 4,697,615, discloses a butterfly valve, for controlling high-temperature fluid flow. Both the valve stem and valve disc, which are ceramic, are integrally formed as a unitary piece.

U.S. Pat. No. 4,944,325, issued to Baldwin et. al. discloses an erosive fluid butterfly valve, the valve comprising a housing formed by two flanged frustoconical body segments joined at their widest ends. The shaft is not readily removable.

Yohner, in U.S. Pat. No. 5,125,624, discloses a stem and disc arrangement; that is interfitted by slots. However, the purpose of this arrangement is to allow sufficient "play" in the slots, so that another "bonding means" such as a weld bead may be used to permanently join the disc and stem.

In U.S. Pat. No. 4,699,357, issued to Sisk, there is disclosed a butterfly valve housing having apertures diametrically aligned therein and counterbored, with the valve shaft passing completely through the valve disc and seating into both apertures so as to furnish a positive disc control during continuous industrial applications of the valve.

All of the aforementioned shaft-disc connections share a disadvantage in that the shaft is either permanently attached to the disc, such as by interference or compression fit, or is alternatively mounted to the disc by anchoring means such as bolts and the like. These types of connections require an invasive procedure into the flow line and disc valve housing in order to repair or replace a shaft. This necessitates the shut down of the flow line along with the disassembly of the valve disc housing structure. The economic disadvantage of this "down-time" for repair is obvious. The likelihood of contamination of surrounding environments by toxic flow line materials and the requisite decontamination and clean up costs as well as the danger to health due to worker exposure are also disadvantageous.

SUMMARY OF THE INVENTION

Thus, a butterfly valve is provided having an improved stub shaft to disc connection comprising a valve disc with a hub that is adapted to be rotated between an open and closed position. The hub is formed at a point adjacent the circumference of the disc. A valve disc seat is adapted to engage the valve disc in the closed position. A shaft, to permit torque to be transmitted to the valve disc from a point external thereof, has one end inserted into the bore of the hub.

The bore consists of a single larger aperture contiguous with a plurality of smaller apertures. The end of the shaft inserted into the hub bore has a plurality of bowels mounted into it, these dowel firmly seat into the smaller apertures of the hub bore and thereby engage the shaft to the valve disc. This engagement prevents relative movement between the disc and the shaft.

The connection, while secure, is not permanent and allows for easy removal of the shaft for repair of replacement without the necessity of removing the valve disc from it's housing and the incident interruption of the line flow, or the possibility of contamination from line flow materials, to the surrounding environment.

Additionally, the plurality of dowels are designed to provide sufficient strength to operate the valve under extreme stress, but are also designed to fail and shear before any other critical element of the valve disc or drive shaft, thereby freeing up the drive shaft for continued rotation in an automated system and hence preventing destruction of the drive shaft driving mechanism. The tolerance fit between the dowels and the smaller apertures of the disc hub allows for the easy retrieval of sheared dowels from the valve disc hub.

It is therefore an object of the present invention to provide an improved stud shaft to disc connection for a butterfly valve which will not be subject to failure due to the internal pressure of the valve.

It is another object of the present invention to provide an improved stub shaft to disc connection for a butterfly valve which reduces the manufacturing time and expense of construction of the valve disc and shaft.

Another object of the present invention is the provision of an improved stub shaft to disc connection for a butterfly valve which creates a thinner profiled disc, which does not create any additional protuberances in the flow stream when the valve is in the open position, and allows for an increase in the amount of line media through the line, when the valve is in the open position.

A still further object of the present invention is to provide an improved stub shaft to disc connection for a butterfly valve wherein the shaft is not exposed to line media materials.

Still a further object of the present invention is to provision of an improved stub shaft to disc connection for a butterfly valve that allows for easy disengagement of the shaft from the disc without an invasive procedure into the valve housing or flow line for repair or replacement of the actuator shaft.

Yet a still further object of the present invention is the provision of an improved stub shaft to disc connection for a butterfly valve wherein the means for engaging the shaft to the valve disc is designed to provide sufficient strength to operate the valve under extreme stress, but is also of such a design and composition so that the dowels will fail and shear before any deformation of either the valve disc or shaft when the valve is exposed to critical torque stresses which exceed the design and or pressure ratings of the valve.

A further object of the present invention is to provide an improved stub shaft to disc connection for a butterfly valve wherein the tolerances of the means of engaging the shaft to the disc allows for retrieval of sheared dowels from the smaller apertures of the valve disc hub.

Still a further object of the present invention is the provision of an improved stub shaft to disc connection for a butterfly valve wherein the weight of the valve disc is decreased.

These and other objects, advantages and novel features of the present invention will become apparent from the following detailed description of the invention when considered in conjunction with the accompany drawings.

DETAILED DESCRIPTION OF THE PREFERRED EMBODIMENTS

Figure 1:
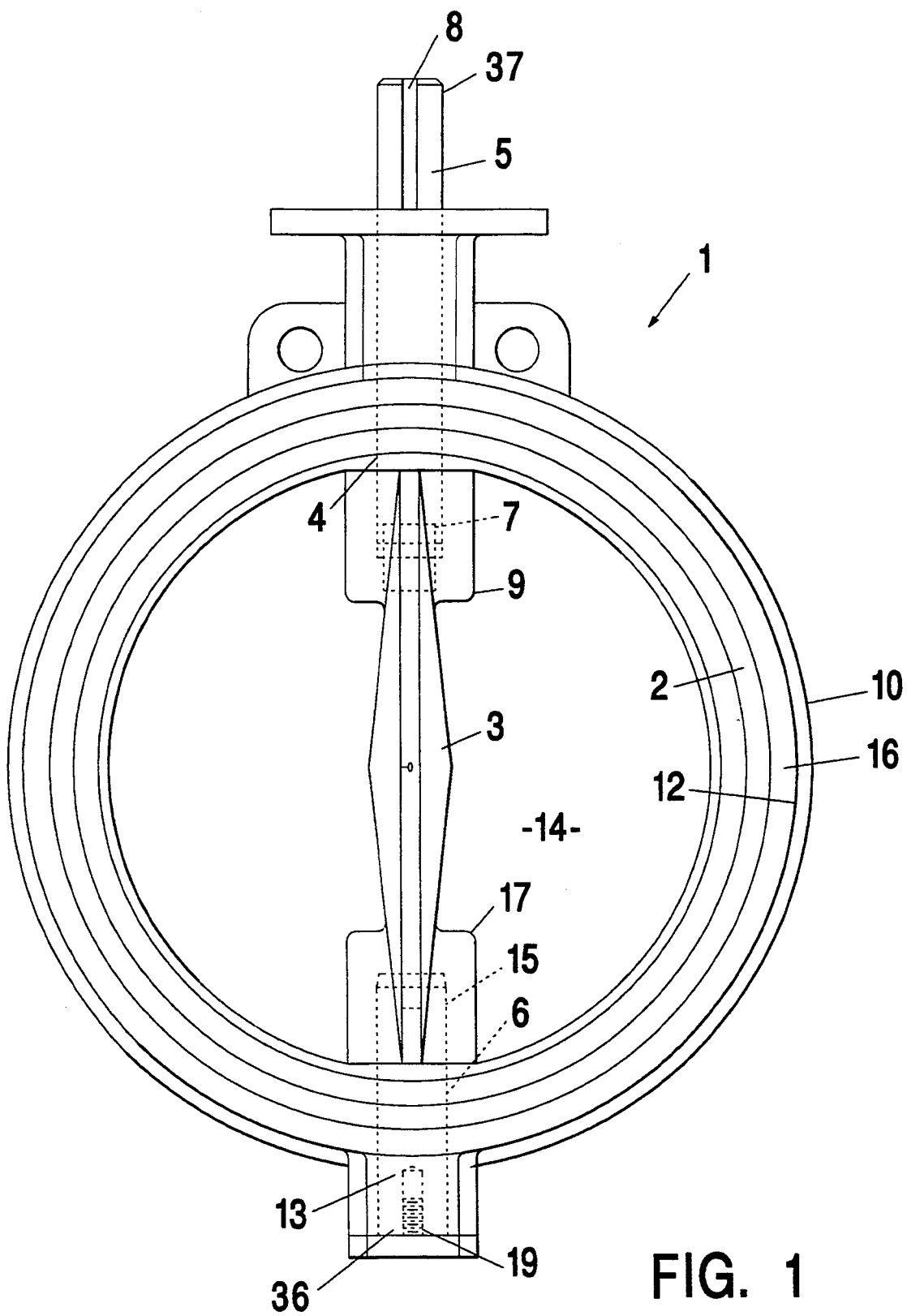
FIG. 1 Shows an "in line" view of the improved stub shaft to disc connection for a butterfly valve according to the present invention, (valve disc in open position).
Figure 2:
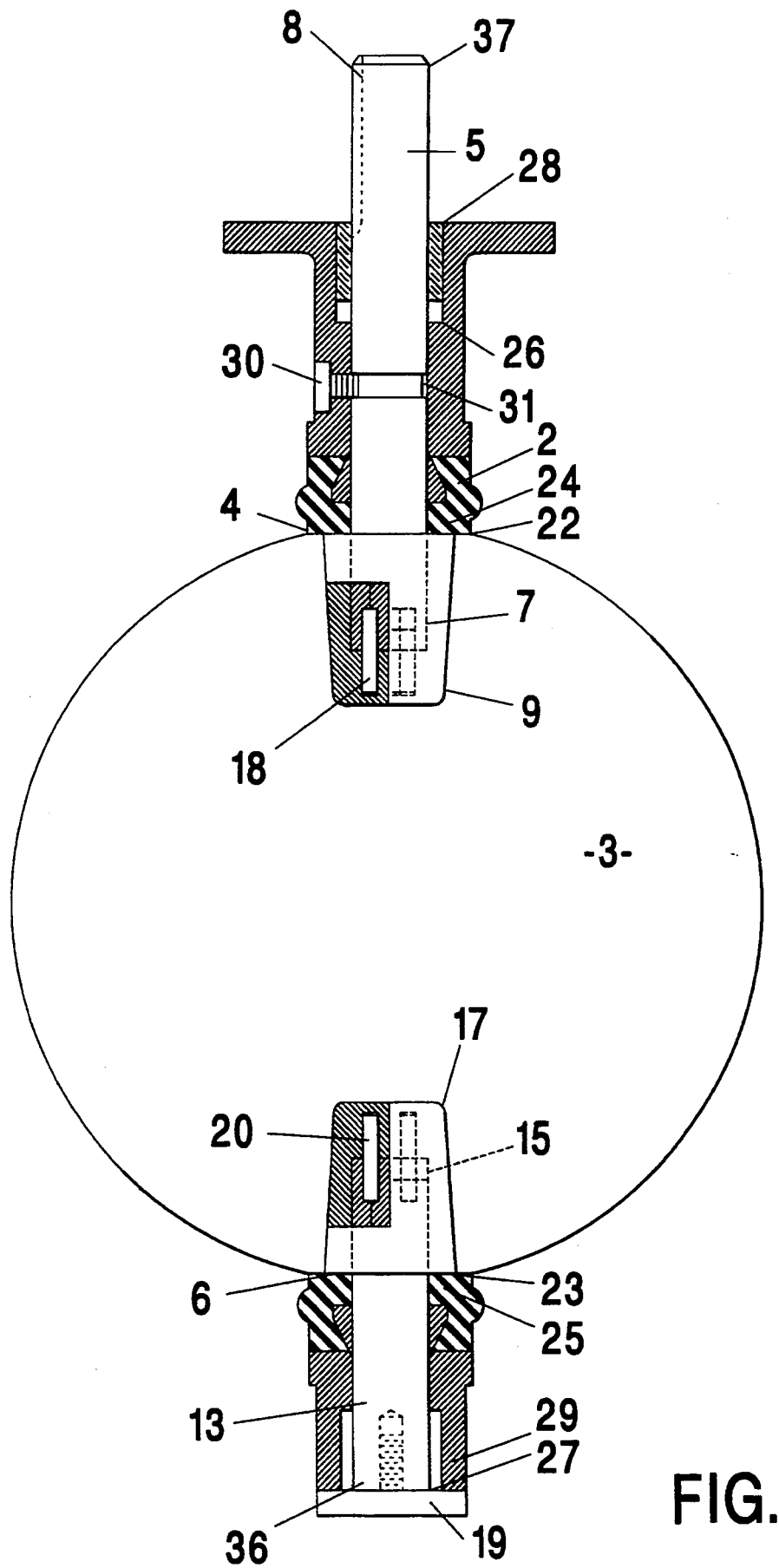
FIG. 2 Shows a cross section view of FIG. 1 on the centerline.

FIG. 1. Shows a butterfly valve 1, including a disc 3, adapted to be rotated between an open and a closed position. A first upper driving shaft 5 with key slot 8, has one end 7 engaging disc 3 at a hub 9 and extends outwardly therefrom. The opposite end 37 is connected to a suitable driving mechanism (not shown). A valve seat 2 made of resilient material, preferably surrounds disc 3 and is adapted to engage the disc when the valve is in the closed position. A second lower anchoring shaft 13 has one end 15 engaging disc 3 at a second hub 17 and extends outwardly therefrom to an anchoring means 19. The valve seat 2 has a pair of apertures 4 and 6 therein. The upper driving shaft 5 extends through aperture 4 and a second lower anchoring shaft 13 extends through aperture 6. The valve body housing 10 is machined to include a dove-tail shaped circumferential groove 12 in the inner surface of the housing adjacent the flow line cavity 14. The valve seat 2 is molded with a corresponding mirror image dove tail extension 16 that is designed to snap into and seat in groove 12 and fit snugly to prevent any deformation of the seat during the opening and closing of the valve disc. Preferably, seat 2 should be strong enough to support the rated pressure of the valve, even without the housing. Typical seat materials include BUNA-N, EPDM, Viton, Teflon, and the like. The upper and lower apertures 4 and 6 respectively in valve seat 2 include a means for sealing the outward portion of shafts 5 and 13 respectively from the flow line cavity 14, thereby preventing flow line material from leaking out around the shafts. As is best seen in FIG. 2, primary seals 22 and 23 are formed between the machine surface area of hubs 9 and 17 and seat 2 due to the increased thickness of the hub portions relative to the main portions of the disc 3 and the diameter of the aperture 4 and 6 in seat 2 being smaller than diameter of the corresponding hubs.

Secondary seals 24 and 25 exist at apertures 4 and 6 for upper driving shaft 5 and lower anchoring shaft 13 respectively. The diameter of the aperture is slightly smaller than the diameter of the corresponding shafts thereby forming an interference fit between the shafts and the seat. The thickness of the valve seat surrounding the respective apertures at the point where the seat is actually in contact with the shafts as they pass through the apertures in the seat aids in additional sealing and preventing flow line material from leaking out around the shaft. Additionally, tertiary seal 26 is formed using a rubber v-packing seal wherein the outside diameter of the seal is slightly larger than the diameter of the corresponding aperture 4 in seat 2, and the diameter of the inside aperture of the v-packing seal is slightly smaller than the diameter of corresponding shaft 5, thereby forming an interference fit. O-ring 27 serves as a static seal to protect against flow line media leakage to the outside environment.

Bushings 28 and 29 reduce friction and align shafts 5 and 13 respectively.

A shaft retaining bolt 30 is positioned by turning to engage groove 31 in upper driving shaft 5 key slot 8 is located on upper driving end 37 of upper driving shaft 5. Shaft retaining bolt 30 is mounted in the valve housing itself and when positioned to engage groove 31, is a safety mechanism designed to prevent upper driving shaft 5 ejection due to build up of pressure in flow line 14.

Figure 3:
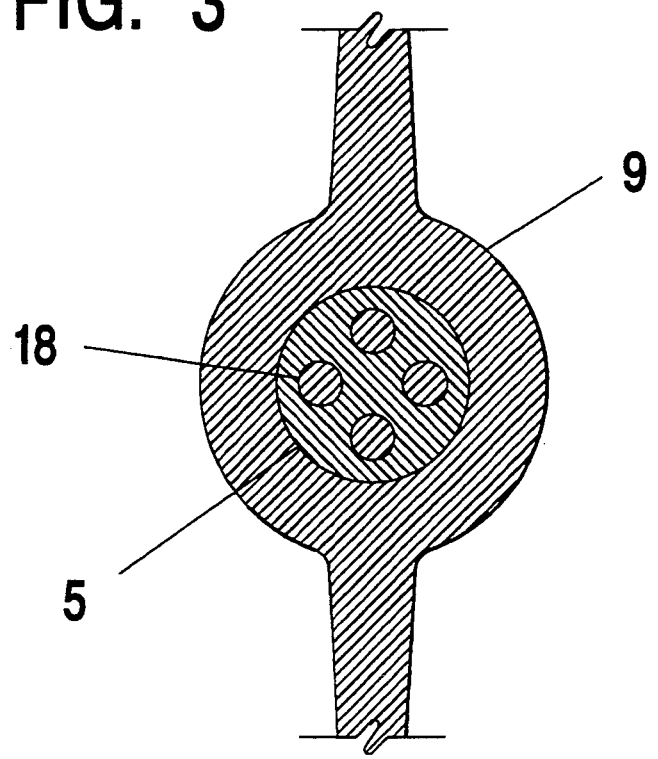
FIG. 3 Shows a cross section view of upper shaft, showing shaft and dowels with shaft in place in upper hub bore.

Referring now to FIG. 3, there is shown in cross section, the upper driving shaft 5 and dowels 18 with the shaft engaged in upper valve disc hub 9.

Figure 4:
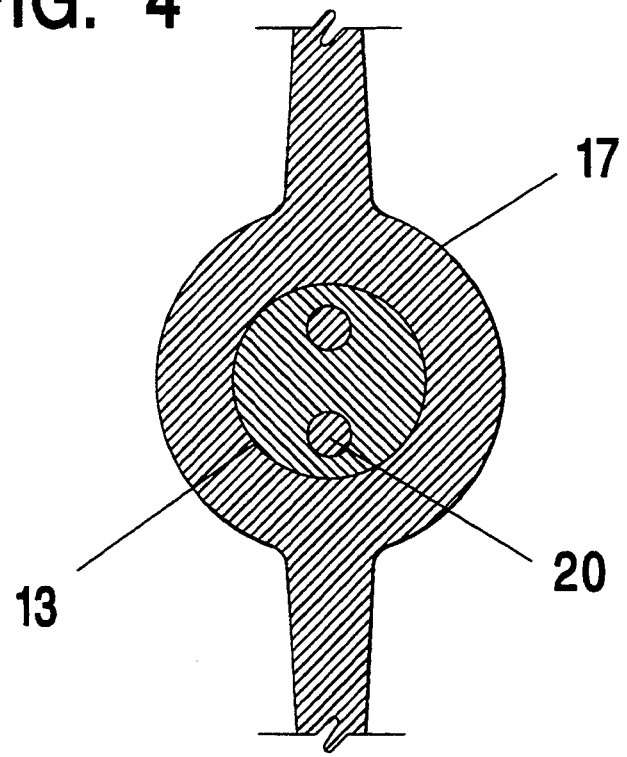
FIG. 4 Shows a cross section view of lower shaft, showing shaft and dowels with shaft in place in lower hub bore.

As is best seen in FIG. 4, the lower anchoring shaft 13 and dowels 20, are shown in cross section with the shaft engaged in lower valve disc hub 17.

Figure 5:
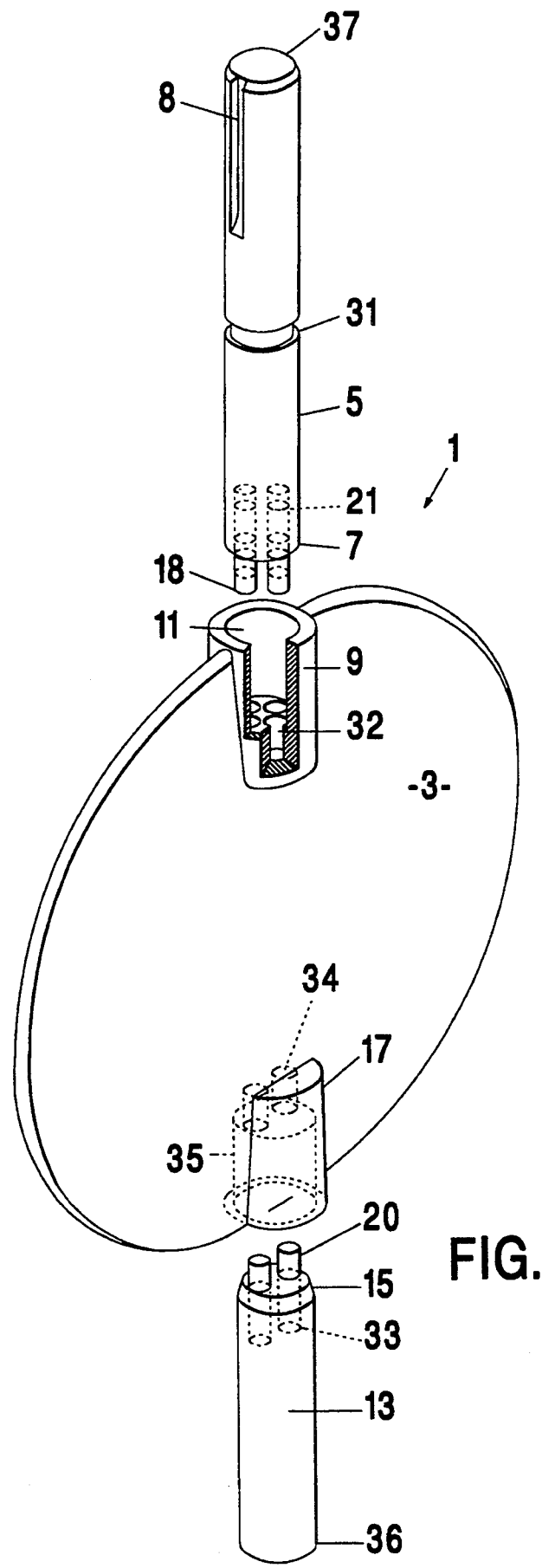
FIG. 5 Shows an exploded isometric view of the upper driving shaft with dowels, lower anchoring shaft with dowels, and the valve disc, with a relief and partial cross sectional view of the valve disc upper and lower hubs.

The particularly important features of the present invention are shown in FIG. 5, an exploded, isometric view of upper driving shaft 5 and lower anchoring shaft 13 with dowels 18 and 20 respectively in valve disc 3. No features of the valve housing, sealing means, driving means or anchoring means are shown. An upper drive shaft 5, showing retaining groove 31 and keyslot 8, is joined to valve disc 3, by forming valve disc 3, with a hub 9 at a point adjacent the circumference of valve disc 3. Apertures are machined into hub 9 parallel to the plane of the surface of valve disc 3, consisting of single larger aperture 11 contiguous with a plurality of smaller apertures 32, positioned at a point more distal the circumference of disc 3 than single larger aperture 11. Single larger aperture 11 has a diameter slightly larger than the diameter of upper drive shaft 5 and a depth equal to approximately one and one-half times the diameter of upper drive shaft 5. Generally, a tolerance fit of 0.0005 inches or less is preferable. The end 7 of upper drive shaft 5 being inserted into hub 9, has machined into and co-axial with its long axis, a plurality of apertures 21, with a depth equal to approximately two times the diameter of dowels 18. A plurality of dowels 18, whose number and spatial placement are identical to that of the plurality of smaller apertures 32 present in hub 9 and whose diameter is slightly larger than the diameter of smaller apertures 21, are press fitted into apertures 21. This fit should be secure enough to retain dowels 18 in upper drive shaft 5 when upper drive shaft 5 is removed from hub 9, but should not cause any deformation of the end 7 of upper drive shaft 5 or dowels 18, either radially or otherwise. The depth of smaller apertures 32 in hub 9 is equal to approximately two times the diameter of dowels 18. The diameter of dowels 18 is slightly less than the diameter of smaller apertures 32. Generally a tolerance fit of 0.0003 inches or less is preferable. Upper drive shaft 5 is inserted into single larger aperture 11 of hub 9 and hand pressed in. The dowels 18 are of such a length and diameter that they insert and seat firmly into smaller apertures 32 of hub 9, thereby preventing relative movement between disc 3 and upper drive shaft 5. This engagement of upper drive shaft 5 and dowels 18 in single larger aperture 11 and plurality of smaller apertures 32 of hub 9 respectively, forms a secure although not permanent, connection between upper drive shaft 5 and valve disc 3.

Lower anchoring shaft 13 is joined to valve disc 3 by forming valve disc 3 with a second hub 17 at a point co-axial the long axis of disc hub 9 adjacent the circumference of valve disc 3, at a point directly opposite hub 9 along the plane of the surface of valve disc 3. Apertures are machined into second hub 17 parallel to the plane of the surface of valve disc 3, consisting of single larger aperture 35 contiguous with a plurality of smaller apertures 34, positioned at a point more distal the circumference of valve disc 3 than single larger aperture 35. Single larger aperture 35 has a diameter slightly larger than the diameter of lower anchoring shaft 13. Generally, a tolerance fit of 0.0005 inches or less is preferable. The end 15 of lower anchoring shaft 13 has machined into and co-axial with its long axis a plurality of apertures 33, with a depth equal to approximately two times the diameter of dowels 20. A plurality of dowels 20, whose number and spatial placement are identical to that of the plurality of smaller apertures 34 present in second hub 17 and whose diameter is slightly larger than the diameter of smaller apertures 33 are press fitted into apertures 33. This fit should be secure enough to retain dowels 20 in lower anchoring shaft 13, when lower anchoring shaft 13 is removed from hub 17, but the press fitting should not cause any deformation of the end 15 of lower anchoring shaft 13 or dowels 20, either radially or otherwise. The depth of smaller apertures 34 in second hub 17 is equal to approximately two times the diameter of dowels 20. The diameter of dowels 20 is slightly less than the diameter of smaller apertures 34. Generally a tolerance fit of 0.0003 inches or less is preferable. End 15 of lower anchoring shaft 13 is inserted into single larger aperture 35 of second hub 17 and hand pressed in. Dowels 20 are of such a length and diameter that they insert firmly into smaller apertures 34 of second hub 17, thereby preventing relative movement between valve disc 3 and lower anchoring shaft 13. This engagement of lower anchoring shaft 13 and dowels 20 in single larger aperture 35 and plurality of smaller apertures 34 of second hub 17 respectively, forms a secure although not permanent connection between lower anchoring shaft 13 and valve disc 3.

The means for engaging upper drive shaft 5 to valve disc 3, namely dowels 18 inserted into smaller apertures 32, and upper drive shaft 5 into single larger aperture 11, is designed to provide sufficient strength to operate valve disc 3 under extreme stress, while at the same time being of such a design and composition that dowels 18, will fail and shear before any deformation of either valve disc 3 or upper driving shaft 5, when valve disc 3 is exposed to critical torque stresses which exceed the design and ratings of the valve insert.

The material composition for the preferred embodiment of the present invention is; an upper drive shaft 5 and lower anchoring shaft 13 made of 304 stainless steel with a tensile strength of 85 PSI and a yield strength of 35 PSI, dowels 18 and dowels 20 constructed of 4140 CF HT B7 cold rolled heat treated steel, and valve disc 3 composed of 316 SS CF8M stainless steel. A second preferred composition includes upper drive shaft 5 and lower anchoring shaft 13 made of 416 stainless steel with a tensile strength of 75 PSI and a yield strength of 40 PSI, dowels 18 and dowels 20 constructed of 4140 CF HT B7 cold rolled heat treated steel, and valve disc 3 composed of nodular iron.

While there has been described what is at present considered to be the preferred embodiment of the present invention, it will be obvious to those skilled in the art that various changes and modifications may be made therein, without departing from the scope of the invention, and it is, therefore deemed in the appended claims to cover all such changes and modifications as followed in the true spirit and scope of the present invention.

What is claimed and desired to be secured by Letters Patent is:

1. An improved shaft and valve disc connection for butterfly valve comprising:
   a valve disc having a hub and adapted to be rotated between an open and a closed position in a flow line;
   a valve disc seat adapted to engage said valve disc in said closed position:
   a shaft having one end inserted into a bore of said hub, said bore having a single larger aperture contiguous with a plurality of smaller apertures, said shaft having a diameter less than the diameter of said larger aperture and aligned along substantially the same axis as the axis of said larger aperture and extending outwardly therefrom to permit torque to be transmitted to said valve disc from a point external thereof, one end of said shaft including:
   a plurality of dowels for engaging said shaft into said bore of said valve disc hub, each of said dowels having a diameter less than the diameter of said smaller apertures and having an axis aligned along substantially the same axis as the axis of said shaft and having a diameter less than one-half the diameter of said shaft and mounted in apertures located in the end of said shaft and protruding therefrom and positioned in such a manner so that said dowels have an axis that is aligned along substantially the same axis as the axis of said smaller apertures.

2. An improved shaft and valve disc connection for butterfly valve as defined in claim 1, wherein said bore of said valve disc hub comprises a single larger aperture mating with said shaft and having a depth equal to approximately one and one-half times the diameter of the shaft.

3. An improved shaft and valve disc connection for butterfly valve as defined in claim 2, wherein said bore of said valve disc hub also comprises a plurality of smaller apertures mating with said plurality of dowels and having a depth equal to approximately two times the diameter of said dowels for preventing relative movement between said disc and said shaft.

4. An improved shaft and valve disc connection for butterfly valve as defined in claim 3, wherein said dowels mounted in said apertures located in the end of said shaft have a diameter slightly larger that said apertures.

5. An improved shaft and valve disc connection for butterfly valve as defined in claim 4, wherein said dowels are press fit into said apertures located in the end of said shaft.

6. An improved shaft and valve disc connection for butterfly valve as defined in claim 5, wherein said dowels, said shaft and said valve disc, are comprised of such materials so that said dowels will fail and shear before any physical deformation of said shaft or said valve disc, when said valve is exposed to critical torque stresses which exceed the design and or pressure ratings of the valve.

7. An improved shaft and valve disc connection for butterfly valve as defined in claim 6, wherein said dowels are made of 4140 CF HT B7 steel, said shaft is made of 304 SS stainless steel, and said valve disc is made of 316 SS CF8M stainless steel.

8. An improved shaft and valve disc connection for butterfly valve, as defined in claim 1, further including another shaft having one end affixed to said disc in a bore in a second hub and extending outwardly therefrom, said bore having a single larger aperture contiguous with a plurality of smaller apertures, said other shaft having a diameter less than the diameter of said larger aperture and aligned along substantially the same axis as the axis of said larger aperture and said one end of said other shaft including a plurality of dowels for engaging said other shaft into said bore of said second hub, each of said dowels having a diameter less than the diameter of said smaller apertures and having an axis aligned along substantially the same axis as the axis of said other shaft and having a diameter less than one-half the diameter of said other shaft and mounted in apertures located in the end of said other shaft and protruding therefrom and positioned in such a manner so that said dowels have an axis that is aligned along substantially the same axis as the axis of said smaller apertures.

9. An improved shaft and valve disc connection for butterfly valve as defined in claim 8, wherein said shaft to valve disc connection is not exposed to line media.

10. An improved shaft and valve disc connection for butterfly valve as defined in claim 9, wherein said shaft to valve disc connection does not create additional protuberance in the flow media when the valve is in the open position.

11. An improved shaft and valve disc connection for butterfly valve as defined in claim 9, wherein, upon failure and shearing of said dowels, said shaft and valve disc connection may be repaired without the necessity of disassembly of the valve housing and invasion of the flow line.

12. An improved shaft and valve disc connection for butterfly valve as defined in claim 8, wherein the diameter of said other shaft relative to the diameter of said larger aperture is 0.0005 inches or less.

13. An improved shaft and valve disc connection for butterfly valve as defined in claim 8, wherein the diameter of said dowels relative to the diameter said smaller apertures is 0.0003 inches or less.

14. An improved shaft and valve disc connection for butterfly valve as defined in claim 1, wherein the diameter of said shaft relative to the diameter of said larger aperture is 0.0005 inches or less.

15. An improved shaft and valve disc connection for butterfly valve as defined in claim 1, wherein the diameter of said dowels relative to the diameter of said smaller apertures is 0.0003 inches or less.

* * * * *